United States Patent
Singh et al.

(10) Patent No.: US 9,292,380 B2
(45) Date of Patent: Mar. 22, 2016

(54) MEMORY ACCESS SCHEME FOR SYSTEM ON CHIP

(71) Applicants: Nitin Singh, Delhi (IN); Gaurav Jain, Kharar (IN); Amit Jindal, Sonepat (IN); Rohit Tomar, Nangal Raya (IN)

(72) Inventors: Nitin Singh, Delhi (IN); Gaurav Jain, Kharar (IN); Amit Jindal, Sonepat (IN); Rohit Tomar, Nangal Raya (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 110 days.

(21) Appl. No.: 14/246,140

(22) Filed: Apr. 6, 2014

(65) Prior Publication Data

US 2015/0286525 A1 Oct. 8, 2015

(51) Int. Cl.
| | |
|---|---|
| G06F 11/10 | (2006.01) |
| G06F 12/06 | (2006.01) |
| G06F 13/40 | (2006.01) |
| G06F 11/14 | (2006.01) |
| G06F 11/16 | (2006.01) |

(52) U.S. Cl.
CPC ........ *G06F 11/1016* (2013.01); *G06F 11/1412* (2013.01); *G06F 11/165* (2013.01); *G06F 12/063* (2013.01); *G06F 13/4022* (2013.01); *G06F 2212/206* (2013.01)

(58) Field of Classification Search
CPC .................................................. G06F 11/1076
USPC .................................................. 714/768, 770
See application file for complete search history.

(56) References Cited

U.S. PATENT DOCUMENTS

| | | | |
|---|---|---|---|
| 5,412,788 A | 5/1995 | Collins | |
| 5,867,642 A | 2/1999 | Chan | |
| 6,816,986 B1 | 11/2004 | Fanning | |
| 8,412,987 B2 | 4/2013 | Billing | |
| 2008/0005516 A1 | 1/2008 | Meinschein | |
| 2010/0262751 A1* | 10/2010 | Avudaiyappan | G06F 12/0292 711/5 |
| 2013/0339572 A1* | 12/2013 | Fanning | G11C 16/00 711/102 |
| 2015/0095546 A1* | 4/2015 | Bennett | G06F 3/064 711/5 |

* cited by examiner

*Primary Examiner* — Fritz Alphonse
(74) *Attorney, Agent, or Firm* — Charles E. Bergere

(57) ABSTRACT

Hardware processors in an SOC integrated circuit logically swapping memories by remapping memory addresses, including tightly coupled and local memories, to enable a sequence of data-processing algorithms to execute more quickly by different hardware processors without having to copy the data between different memories using a relatively slow data crossbar switch. When a memory stores error-correction code (ECC) address information linking stored ECC data with stored user data, the hardware processor dynamically remaps the ECC address information, as needed.

18 Claims, 2 Drawing Sheets

MEMORY ACCESS SCHEME FOR SYSTEM ON CHIP

BACKGROUND OF THE INVENTION

The present invention relates generally to integrated circuit memory access schemes, and more particularly to memory access in integrated circuits having multiple hardware accelerators.

FIG. 1 shows a block diagram of a portion of an exemplary conventional SOC (system on chip) integrated circuit (IC) 100 having multiple hardware accelerators. In particular, the SOC 100 has hardware acceleration (HWA) processors 110, 120, and 140.

As shown in FIG. 1, the HWA processor 110 includes a signal processing co-processor 112, tightly coupled memory (TCM) 114, and memory controller 116. The co-processor 112 is a hardware accelerator (e.g., application-specific integrated circuitry (ASIC)) designed to perform one or more particular data-processing algorithms quickly and efficiently. As controlled by the memory controller 116, the co-processor 112 accesses and processes data stored in the TCM memory 114 and stores the resulting processed data back into the TCM memory 114. The HWA processor 120 is analogous to a central processing core.

The HWA processor 140 has three co-processors 142, 144, and 146 configured to perform different data-processing algorithms, such as filtering, fast Fourier transform (FFT) processing, or sequencing, where each co-processor functions as a different hardware accelerator. The HWA processor 140 also has a local SRAM (static random access memory) 148 and controller (bus interface) 150. Similar to the HWA processors 110 and 120, as controlled by the controller 150, each hardware accelerator 142, 144, 146 of the HWA processor 140 accesses and processes data stored in the local memory 148 and stores the resulting processed data back into the local memory 148.

In addition to local and tightly coupled memories, the SOC 100 also has a system memory 160 with twelve banks 162 of independently addressable SRAM memory. The HWA processors 110, 120, and 140 are able to access (i.e., read data from and/or write data to) the memory banks 162 of the system memory 160 simultaneously in a non-blocking manner via a data crossbar switch (i.e., arbiter) 170 and system memory controller 180. In addition to being able to access the system memory 160 via the data crossbar switch 170, the HWA processor 140 is also able to access the system memory 160 via a dedicated bus 152 and system memory controller 180, bypassing the data crossbar switch 170. The bus 152 enables the HWA processor 140 to access system memory 160 faster than by using data the crossbar switch 170.

Assume, for example, an exemplary data-processing routine involving the sequence of a data-processing algorithm of hardware accelerator 142 of the HWA processor 140 followed by a data-processing algorithm of the hardware accelerator 144 of the HWA processor 140 followed by a data-processing algorithm of the hardware accelerator 112 of the HWA processor 110. The sequence of events for this exemplary data-processing routine may be as follows:

1) Controller 150 copies a first set of (original) data from memory bank 162 of system memory 160 into local memory 148 via bus 152 and memory controller 180.
2) Hardware accelerator 142 accesses and processes the first set of data stored in local memory 148 and stores the resulting second set of (processed) data back into local memory 148.
3) Hardware accelerator 144 accesses and processes the second set of data stored in local memory 148 and stores the resulting third set of (further processed) data back into local memory 148. (Note that, since hardware accelerators 142 and 144 share the same local memory 148, the second set of data does not have to be stored back into system memory 160. If hardware accelerators 142 and 144 had different local memories, then the controller for hardware accelerator 142 would first copy the second set of data from its local memory into system memory 160, and the controller for hardware accelerator 142 would then copy the second set of data from system memory 160 into its local memory.)
4) Controller 150 copies the third set of data from local memory 148 into memory bank 162 of system memory 160 via bus 152 and memory controller 180.
5) Controller 116 of HWA processor 110 copies the third set of data from memory bank 162 of system memory 160 into TCM memory 114 via data crossbar switch 170 and memory controller 180.
6) Hardware accelerator 112 accesses and processes the third set of data stored in TCM memory 114 and stores the resulting fourth set of (still further processed) data back into TCM memory 114.
7) Controller 116 copies the fourth set of data from TCM memory 114 into memory bank 162 of system memory 160 via data crossbar switch 170 and memory controller 180, such that the fourth set of data is available for further handling by SOC 100.

Because steps (5) and (7) involve the relatively slow data crossbar switch 170, this exemplary data-processing routine is slower than it would be if the SOC 100 were included a fast bus between the HWA processor 110 and the system memory controller 180 similar to the bus 152. Furthermore, the time that it takes for some data-processing routines to be performed using the data crossbar switch 170 may be too long for certain applications. However, designing the SOC 100 to have a fast bus between the HWA processor 110 and the system memory controller 180 would take up additional layout area.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale. For example, the thicknesses of layers and regions may be exaggerated for clarity.

DETAILED DESCRIPTION OF THE INVENTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In one embodiment, the present invention provides a method of processing data within an integrated circuit. A first set of data is processed using a first hardware processor to generate a second set of data. The second set of data is stored in a first memory. Addresses of the first memory are remapped with addresses of a second memory to swap the first and second memories. The second set of data in the first memory is accessed and processed by a second hardware processor using the remapped addresses of the first memory to generate a third set of data.

In another embodiment, the present invention is an integrated circuit comprising a first hardware processor, a first memory associated with the first hardware processor, a second hardware processor, and a second memory associated with the second hardware processor. The first hardware processor is configured to (i) process a first set of data to generate a second set of data and (ii) store the second set of data in the first memory. The second hardware processor is configured to (i) remap addresses of the first memory with addresses of the second memory to swap the first and second memories and (ii) access and process the second set of data in the first memory using the remapped addresses of the first memory to generate a third set of data.

Figure 1:
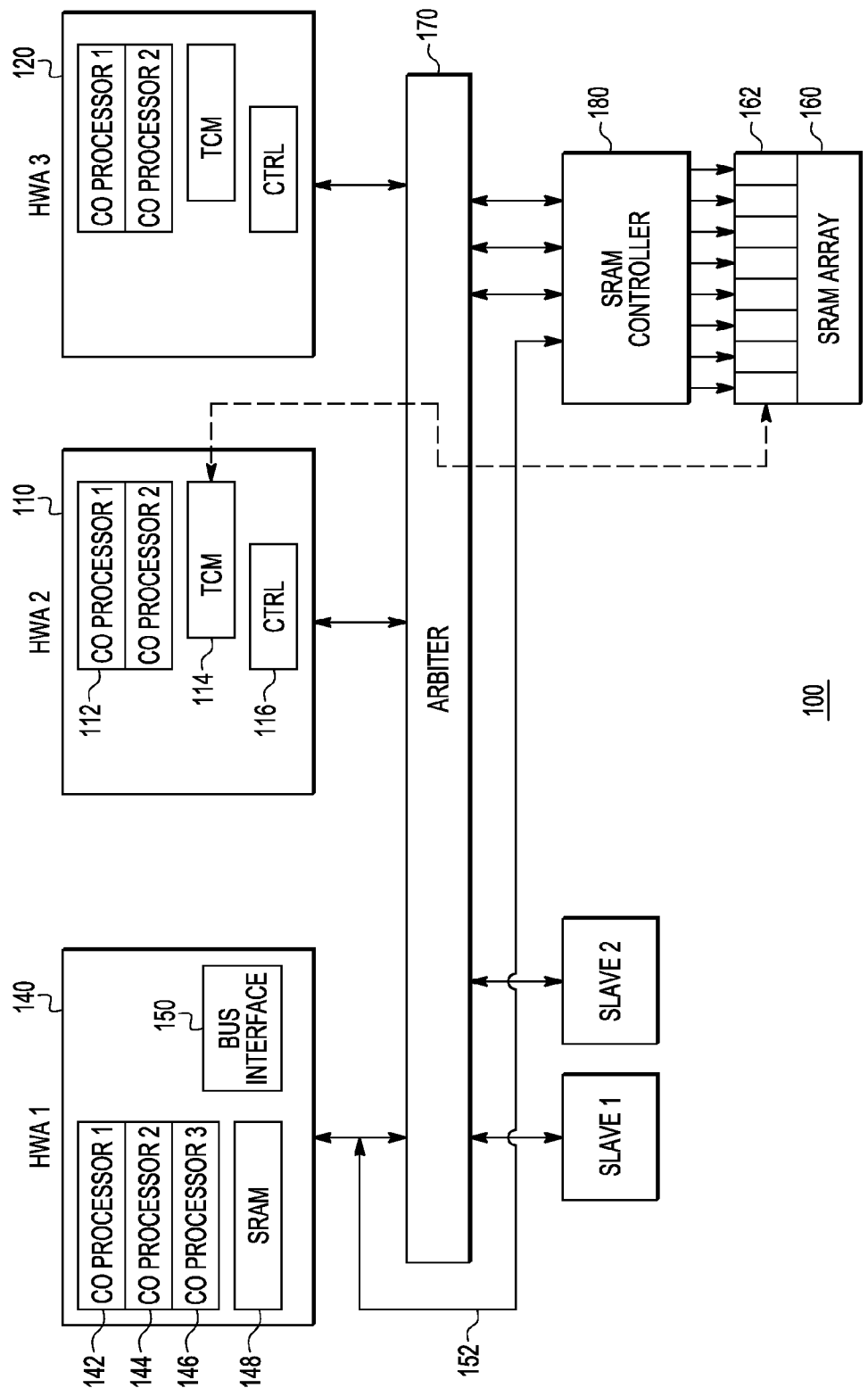
FIG. 1 shows a block diagram of a portion of an exemplary conventional SOC (system on chip) integrated circuit.
Figure 2:
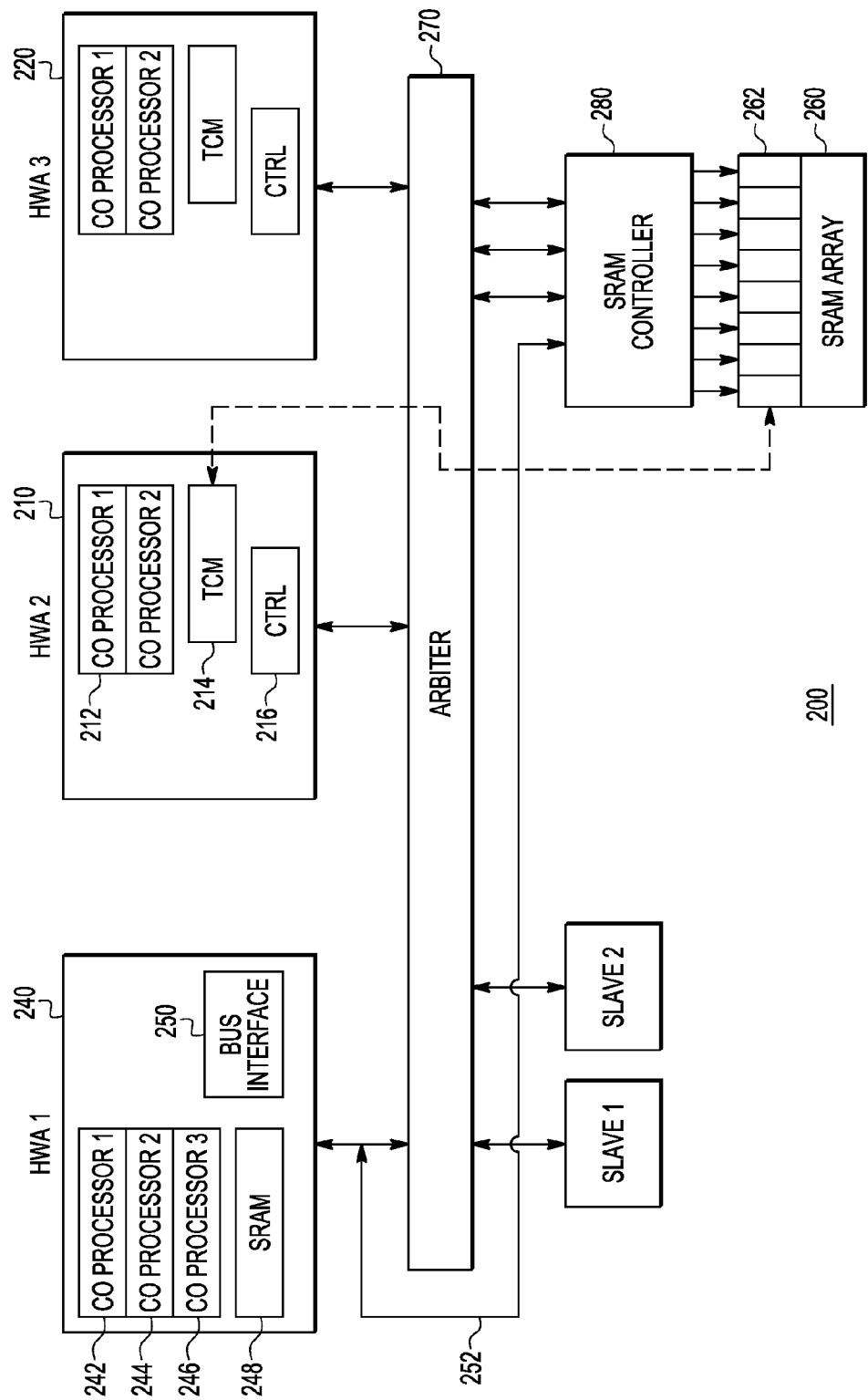
FIG. 2 shows a block diagram of a portion of an exemplary SOC integrated circuit according to one embodiment of the present invention.

FIG. 2 shows a block diagram of a portion of an exemplary SOC integrated circuit 200 according to one embodiment of the invention. The SOC 200 is analogous to the SOC 100 of FIG. 1, with analogous elements having similar labels. One difference between the SOC 200 and the SOC 100 is that, in the SOC 200, pairs of memory blocks can be logically swapped by remapping the memory addresses used by the various processors accessing those memory blocks.

For example, in the SOC 200, the memory addresses for the local TCM memory 214 of the HWA processor 210 can be swapped with the memory addresses for the system memory bank 262 within the controller 216. In this way, after such logical swapping, the hardware accelerator 212 can access the system memory bank 262 quickly without having to use the data crossbar switch 270. After the hardware accelerator 212 is done accessing system memory bank 262, the memory addresses can be logically swapped back the way they were initially. Alternatively, one or both of the memory blocks can be logically swapped with one or two other memory blocks in the SOC 200. Note that each memory bank 262 in the system memory 260 can be treated as a separate, independently swappable memory block. This means that two system memory banks can also be logically swapped with each other. Although not shown in FIG. 2, the SOC 200 has controller logic that keeps track of the current logical assignments of all memory addresses.

The ability to logically swap memory blocks in the SOC 200 enables the exemplary data-processing routine described in the Background section to be implemented using the following sequence of events:

1) Controller 250 of HWA processor 240 copies the first set of (original) data from memory bank 262 of system memory 260 into local memory 248 via bus 252 and memory controller 280.
2) Hardware accelerator 242 accesses and processes the first set of data stored in local memory 248 and stores the resulting second set of (processed) data back into local memory 248.
3) Hardware accelerator 244 accesses and processes the second set of data stored in local memory 248 and stores the resulting third set of (further processed) data back into local memory 248. (Note that the same caveat applies here as in prior-art step (3).)
4) Controller 250 copies the third set of data from local memory 248 into memory bank 262 of system memory 260 via bus 252 and memory controller 280.
5) Controller 216 of HWA processor 210 logically swaps the memory addresses of TCM memory 214 with the memory addresses of system memory bank 262.
6) Hardware accelerator 212 accesses and processes the third set of data stored in system memory bank 262 and stores the resulting fourth set of (still further processed) data back into system memory bank 262.
7) Controller 216 logically swaps the memory addresses of TCM memory 214 with the memory addresses of system memory bank 262, leaving the fourth set of data in system memory bank 262, such that the fourth set of data is available for further handling by SOC 200.

Because steps (5) and (7) do not involve the relatively slow data crossbar switch 270, this exemplary data-processing routine is faster than the corresponding conventional data-processing routine described previously. Furthermore, there is no need for the SOC 200 to have a fast bus between the HWA processor 210 and the system memory controller 280 similar to the bus 252.

In certain implementations of the invention, the data (aka user data) that is processed by data-processing routines, such as that described above, has associated with it error-correction code (ECC) data and ECC address information that links particular sets of ECC data with particular sets of user data. When a set of user data is processed by a hardware accelerator, the corresponding ECC data and ECC address information are also accessed and used (aka consumed) to correct, if needed, the set of user data prior to its processing by the hardware accelerator. Furthermore, the resulting set of processed user data will have its own corresponding ECC data and ECC address information that will need to be stored in memory along with the set of processed user data.

For example, the third set of user data that is stored in system memory bank 262 in step (4) will have corresponding ECC data and ECC address information also stored in system memory bank 262. Similarly, the fourth set of user data stored in system memory bank 262 in step (5) will also have corresponding ECC data and ECC address information stored in system memory bank 262.

Note that, after step (4), the ECC address information for the third set of user data will be based on the memory addresses of system memory bank 262. Furthermore, it is also important for the ECC address information for the fourth set of user data also to be based on the memory addresses of system memory bank 262 after step (7).

According to one embodiment of the invention, after the memory addresses of hardware accelerator 212 and system memory bank 262 are logically swapped in step (5), when the third set of user data is accessed in step (6), the ECC address information is updated on the fly. This means that the ECC address information based on the memory addresses of system memory bank 262 are converted into appropriate ECC address information based on the memory addresses of TCM memory 214 as individual subsets of user data are read from system memory bank 262. Each subset of user data and corresponding ECC data of the third set are then processed to generate a corresponding resulting subset of processed user data and corresponding ECC data of the fourth set. As those individual subsets for the fourth set are written back into system memory bank 262, the memory addresses are then converted on the fly from being based on the memory addresses of TCM memory 214 back into appropriate memory address based on the memory addresses of system memory bank 262. When controller 250 writes data into system memory bank 262, the physical address gets routed to TCM memory 214, whose logical address is different. As such, the ECC data gets updated according to the different logical address so that, when another controller reads that data, it will see no ECC mismatch.

Unless stated otherwise, terms such as "first" and "second" are used to arbitrarily distinguish between the elements such terms describe. Thus, these terms are not necessarily intended to indicate temporal or other prioritization of such elements. Further, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The invention claimed is:

1. A method of processing data within an integrated circuit, the method comprising:
   (a) processing a first set of data using a first hardware processor to generate a second set of data;
   (b) storing the second set of data in a first memory;
   (c) remapping addresses of the first memory with addresses of a second memory to swap the first and second memories; and
   (d) accessing and processing the second set of data in the first memory by a second hardware processor using the remapped addresses of the first memory to generate a third set of data.

2. The method of claim 1, wherein step (d) further comprises storing the third set of data into the first memory.

3. The method of claim 1, wherein the second memory is a tightly coupled memory for the second hardware processor.

4. The method of claim 1, wherein the first memory is part of system memory that can be accessed by the first and second hardware processors via a data crossbar switch.

5. The method of claim 4, wherein step (d) comprises the second hardware processor bypassing the data crossbar switch to access the second set of data in the first memory.

6. The method of claim 5, wherein the second memory is a tightly coupled memory for the second hardware processor.

7. The method of claim 1, wherein:
   the first memory stores second error correction code (ECC) data for the second set of data and second ECC address information linking the second ECC data to the second set of data; and
   step (d) further comprises accessing the second ECC data and the second ECC address information in the first memory and remapping the second ECC address information on the fly.

8. The method of claim 7, wherein step (d) further comprises storing, into the first memory, the third set of data, third ECC data for the third set of data, and third ECC address information linking the third ECC data to the third set of data.

9. The method of claim 8, wherein the third ECC address information is remapped dynamically.

10. An integrated circuit, comprising:
    a first hardware processor;
    a first memory associated with the first hardware processor;
    a second hardware processor; and
    a second memory associated with the second hardware processor, wherein:
      the first hardware processor is configured to (i) process a first set of data to generate a second set of data and (ii) store the second set of data in the first memory; and
      the second hardware processor is configured to (i) remap addresses of the first memory with addresses of the second memory to swap the first and second memories and (ii) access and process the second set of data in the first memory using the remapped addresses of the first memory to generate a third set of data.

11. The integrated circuit of claim 10, wherein the second hardware processor is configured to store the third set of data into the first memory.

12. The integrated circuit of claim 10, wherein the second memory is a tightly coupled memory for the second hardware processor.

13. The integrated circuit of claim 10, wherein the first memory is part of system memory that can be accessed by the first and second hardware processors via a data crossbar switch of the integrated circuit.

14. The integrated circuit of claim 13, wherein the second hardware processor is configured to bypass the data crossbar switch to access the second set of data in the first memory.

15. The integrated circuit of claim 14, wherein the second memory is a tightly coupled memory for the second hardware processor.

16. The integrated circuit of claim 10, wherein:
    the first memory is configured to store second ECC data for the second set of data and second ECC address information linking the second ECC data to the second set of data; and
    the second hardware processor is configured to (i) access the second ECC data and the second ECC address information in the first memory and (ii) remap the second ECC address information dynamically.

17. The integrated circuit of claim 16, wherein the second hardware processor is configured to store, into the first memory, the third set of data, third ECC data for the third set of data, and third ECC address information linking the third ECC data to the third set of data.

18. The integrated circuit of claim 17, wherein the second hardware processor is configured to remap the third ECC address information dynamically.

* * * * *